(12) United States Patent
Shakado et al.

(10) Patent No.: US 12,293,047 B2
(45) Date of Patent: May 6, 2025

(54) INPUT DEVICE WITH AN ELECTROSTATIC CAPACITY DETECTOR

(71) Applicant: Panasonic Intellectual Property Management Co., Ltd., Osaka (JP)

(72) Inventors: Yoshifumi Shakado, Osaka (JP); Takeshi Masutani, Kanagawa (JP); Hideaki Eto, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 18/425,928

(22) Filed: Jan. 29, 2024

(65) Prior Publication Data

US 2024/0264706 A1 Aug. 8, 2024

(30) Foreign Application Priority Data

Feb. 3, 2023 (JP) ................................ 2023-015400
Aug. 31, 2023 (JP) ................................ 2023-141345

(51) Int. Cl.
- *G06F 3/041* (2006.01)
- *G06F 3/01* (2006.01)
- *G06F 3/044* (2006.01)

(52) U.S. Cl.
CPC ............ *G06F 3/0445* (2019.05); *G06F 3/016* (2013.01)

(58) Field of Classification Search
CPC ................................................ G06F 3/041–047
See application file for complete search history.

(56) References Cited

U.S. PATENT DOCUMENTS

| | | | |
|---|---|---|---|
| 2012/0313874 A1* | 12/2012 | Chappaz | G08B 6/00 29/25.35 |
| 2017/0262112 A1* | 9/2017 | Noguchi | G02F 1/13338 |
| 2018/0004332 A1* | 1/2018 | Solven | G06F 3/0445 |
| 2018/0259803 A1* | 9/2018 | Chang | G06F 3/0412 |
| 2022/0206642 A1* | 6/2022 | Sonoda | G06F 3/0447 |

FOREIGN PATENT DOCUMENTS

JP 2021018917 A 2/2021

* cited by examiner

*Primary Examiner* — Roy P Rabindranath
(74) *Attorney, Agent, or Firm* — Seed IP Law Group LLP (57) ABSTRACT

An input device includes: a panel on which a pressing operation is performed by an operating body; a substrate provided on a back surface side of the panel; a first electrode provided on the substrate; a holder that is provided on a back surface side of the substrate, includes a second electrode at a part facing the first electrode, and engages with the panel; a push-in detector that detects electrostatic capacity between the first electrode and the second electrode; and a vibration device held by the holder. The holder moves relative to the substrate when the pressing operation is performed on the panel, has rigidity and conductivity, and covers the second electrode from its back surface side.

20 Claims, 9 Drawing Sheets

INPUT DEVICE WITH AN ELECTROSTATIC CAPACITY DETECTOR

CROSS REFERENCE TO RELATED APPLICATIONS

The present application is based on and claims priority of Japanese Patent Application No. 2023-015400 filed on Feb. 3, 2023, and Japanese Patent Application No. 2023-141345 filed on Aug. 31, 2023.

FIELD

The present disclosure relates to an input device.

BACKGROUND

Conventionally, various input devices that accept input of operations by a user have been studied. For example, Patent Literature (PTL) 1 discloses an input device that detects pressing based on change in electrostatic capacity.

CITATION LIST

Patent Literature

PTL 1: Japanese Unexamined Patent Application Publication No. 2021-18917

SUMMARY

However, the technique according to PTL 1 can be improved upon.

In view of this, the present disclosure provides an input device capable of improving upon the above related art.

An input device according to an aspect of the present disclosure includes: a panel on which a pressing operation is performed by an operating body; a substrate provided on a back surface side of the panel; a first electrode provided on the substrate; a holder that is provided on a back surface side of the substrate, includes a second electrode at a part facing the first electrode, and engages with the panel; an electrostatic capacity detector that detects electrostatic capacity between the first electrode and the second electrode; and an actuator held by the holder, in which the holder moves relative to the substrate when the pressing operation is performed on the panel, has rigidity and conductivity, and covers the second electrode from a back surface side thereof.

According to an aspect of the present disclosure, it is possible to provide an input device that can achieve further improvements.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Underlying Knowledge Forming Basis of the Present Disclosure

As described in "Background Art", the technique according to PTL 1 can be improved upon.

In the input device disclosed in PTL 1, variations may occur in detection depending on a position at which a key top for a pressing operation is operated. In addition, the input device according to PTL 1 can be improved upon in resistance to disturbance noise.

In view of the above, the inventors of the present application have created an input device that can improve the prevention of detection variation and the resistance to disturbance noise, as further improvement in the input device.

An input device according to a first aspect of the present disclosure includes a panel on which a pressing operation is performed by an operating body; a substrate provided on a back surface side of the panel; a first electrode provided on the substrate; a holder that is provided on a back surface side of the substrate, includes a second electrode at a part facing the first electrode, and engages with the panel; an electrostatic capacity detector that detects electrostatic capacity between the first electrode and the second electrode; and an actuator held by the holder. The holder moves relative to the substrate when the pressing operation is performed on the panel, has rigidity and conductivity, and covers the second electrode from a back surface side thereof.

With this configuration, the holder has the rigidity. Accordingly, it is possible to prevent the occurrence of variation in the amount of movement (variation in distance between the first electrode and the second electrode) of the holder depending on a position in the panel, at which the pressing operation is performed, in comparison with a case where the holder does not have the rigidity. Furthermore, the holder is conductive, thereby preventing noise entering the first electrode and the second electrode from the outside. Accordingly, the input device can improve both the prevention of detection variation and the resistance to disturbance noise.

For example, in an input device according to a second aspect of the present disclosure in the first aspect of the present disclosure, the panel may include a first portion on which the pressing operation is performed and a second portion around the first portion, and may be engaged with the holder at a plurality of locations in the first portion in a plan view.

With this configuration, it is possible to reduce variation in the electrostatic capacity detected by the electrostatic capacity detector, in comparison with a case where the panel and the holder are engaged only at a single location. In other words, detection accuracy of the pressing operation in the input device is improved.

For example, in an input device according to a third aspect of the present disclosure in the second aspect of the present disclosure, the second portion may be more flexible than the first portion, one of the plurality of locations may be provided at a center of the first portion in the plan view, and one or more locations remained among the plurality of locations may be provided along a boundary between the first portion and the second portion.

With this configuration, it is possible to prevent the occurrence of difference in pressing pressure between the center and the periphery (difference in pressing positions) of the first portion. This leads to preventing the detection variation.

For example, in an input device according to a fourth aspect of the present disclosure in the second aspect of the present disclosure, at least one of the panel or the holder may include a plurality of engagement portions protruding for engagement at the plurality of locations, and the substrate may include a penetrating hole through which each of the plurality of engagement portions is to be inserted.

With this configuration, the panel and the holder can be engaged with each other through the penetrating holes, so that the panel and the holder can be engaged with each other with a simple structure.

For example, in an input device according to a fifth aspect of the present disclosure in any one of the first to the fourth aspect of the present disclosure, the holder may include metal.

With this configuration, the second electrode and the holder can be formed as a single piece, which facilitates manufacturing.

For example, in an input device according to a sixth aspect of the present disclosure in any one of the first to the fourth aspect of the present disclosure, the holder may include a plate portion having rigidity and insulation, and a metal layer on a front surface of the plate portion.

With this configuration, the plate portion and the metal layer are separate members, which increase the degree of freedom in selecting the members.

For example, in an input device according to a seventh aspect of the present disclosure in any one of the first to the sixth aspect of the present disclosure, the holder may be connected to ground.

With this configuration, the resistance to noise can be improved.

For example, in an input device according to an eighth aspect of the present disclosure in any one of the first to the seventh aspect of the present disclosure, the first electrode may be provided on a back surface of the substrate.

With this configuration, a distance between the first electrode and the second electrode can be reduced, so that the detection accuracy in the electrostatic capacity detector is improved.

For example, in an input device according to a ninth aspect of the present disclosure in the eighth aspect of the present disclosure, the electrostatic capacity detector may be provided at a position on a front surface of the substrate, the position being opposite to the first electrode with the substrate interposed therebetween, and the electrostatic capacity detector and the first electrode may be connected through a through hole provided in the substrate between the electrostatic capacity detector and the first electrode.

With this configuration, the first electrode and the push-in detector can be connected over a short distance via the through holes, so that the influence of noise can be prevented. For example, when a wiring connecting the first electrode and the push-in detector is provided on the surface of the substrate, noise may be mixed and enter from the wiring. Even in such a case, the influence of noise introduced from the wiring can be prevented.

For example, an input device according to a tenth aspect of the present disclosure in any one of the first to the ninth aspect of the present disclosure may include a controller that controls vibration of the actuator based on an output of the electrostatic capacity detector. The controller may disable the output of the electrostatic capacity detector during a period while the actuator is driven.

With this configuration, it is possible to prevent erroneously detecting, as pushing-in, vibration of the actuator while the actuator is being driven.

For example, in an input device according to an eleventh aspect of the present disclosure in the tenth aspect of the present disclosure, the controller may disable the output of the electrostatic capacity detector for a predetermined period after the period while the actuator is driven.

With this configuration, it is possible to prevent erroneously detecting vibrations, as the pushing-in, at the time of attenuation of the actuator after the actuator has been driven.

For example, in an input device according to a twelfth aspect of the present disclosure in the eleventh aspect of the present disclosure, the controller may vary the predetermined period depending on a driving mode of the actuator.

With this configuration, the output of the electrostatic capacity detector is disabled for a predetermined period depending on a vibration mode. Accordingly, it is possible to prevent erroneously detecting, as the pushing-in, vibrations of the actuator, which correspond to a plurality of the vibration modes.

For example, in an input device according to a thirteenth aspect of the present disclosure in the eleventh aspect of the present disclosure, the predetermined period may be a fixed period set in advance.

With this configuration, it is possible to prevent erroneously detecting, as the pushing-in, vibration of the actuator during a preset fixed period. For example, the predetermined period is set to be longer than the attenuation period of the vibration after the actuator has been driven, thereby preventing erroneously detecting, as the pushing-in, the vibration of the actuator more reliably.

It should be noted that each of the embodiments described below represents a comprehensive or specific example of the present disclosure. A numerical value, a shape, a material, a structural component, and an arrangement position, connection form, and the like of the structural components described in the following embodiments are examples, and do not intend to restrict the present disclosure. Furthermore, among structural elements in the following embodiments, structural elements that are not described in independent claims will be described as optional structural elements. Each drawing is a schematic diagram and is not necessarily strictly illustrated. In each drawing, the same configurations are denoted by the same reference numerals.

In the present specification, terms indicating relationships between components such as parallel, terms indicating the shape of components such as rectangular and circular, and numerical values are not expressions that express only strict meanings, but are expressions indicating substantially an equivalent range that contains a difference of several percentage points (or a level of 10%), for example.

Coordinate axes may be illustrated in the drawings to be used for description of the following embodiments and the like. The Z axis indicates a stacking direction in which each structural component of the input device is stacked. The X-axis direction and the Y-axis direction are directions that are orthogonal to each other on a plane perpendicular to the Z-axis direction. The perpendicular direction is a direction parallel to the Z-axis direction. In the following embodiments, a "plan view" means viewing in the Z-axis direction, and a "cross-sectional view" means viewing a cut surface cut along a plane parallel to the stacking direction (Z-axis direction).

In the description of the specification, ordinal numbers such as "first" and "second" do not mean the number or order of components, unless otherwise specified, and are used for the purpose of avoiding confusion between similar components and of distinguishing between them.

EMBODIMENTS

Figure 1:
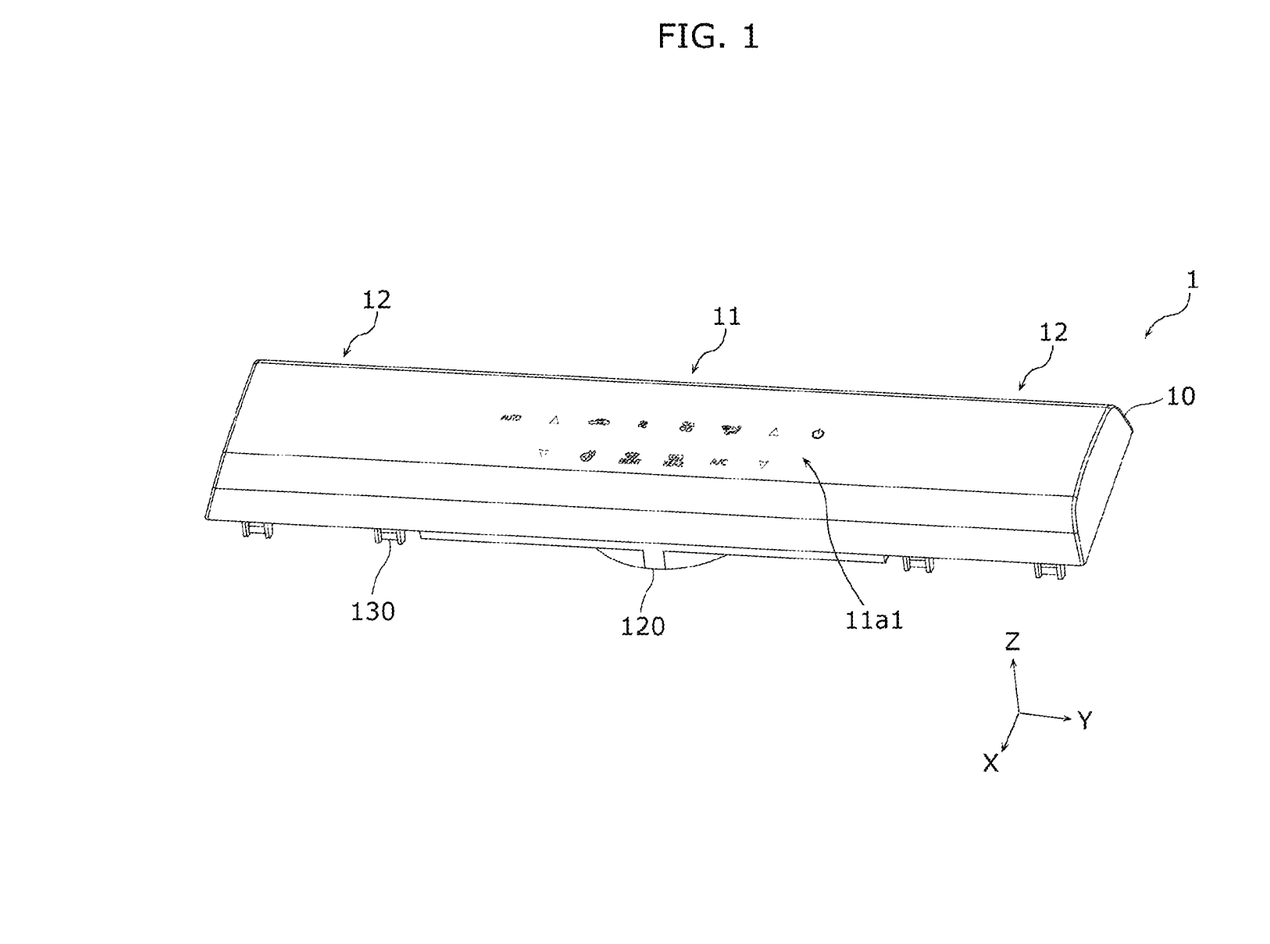
FIG. 1 is a perspective view showing a configuration of an input device according to an embodiment.
Figure 2:
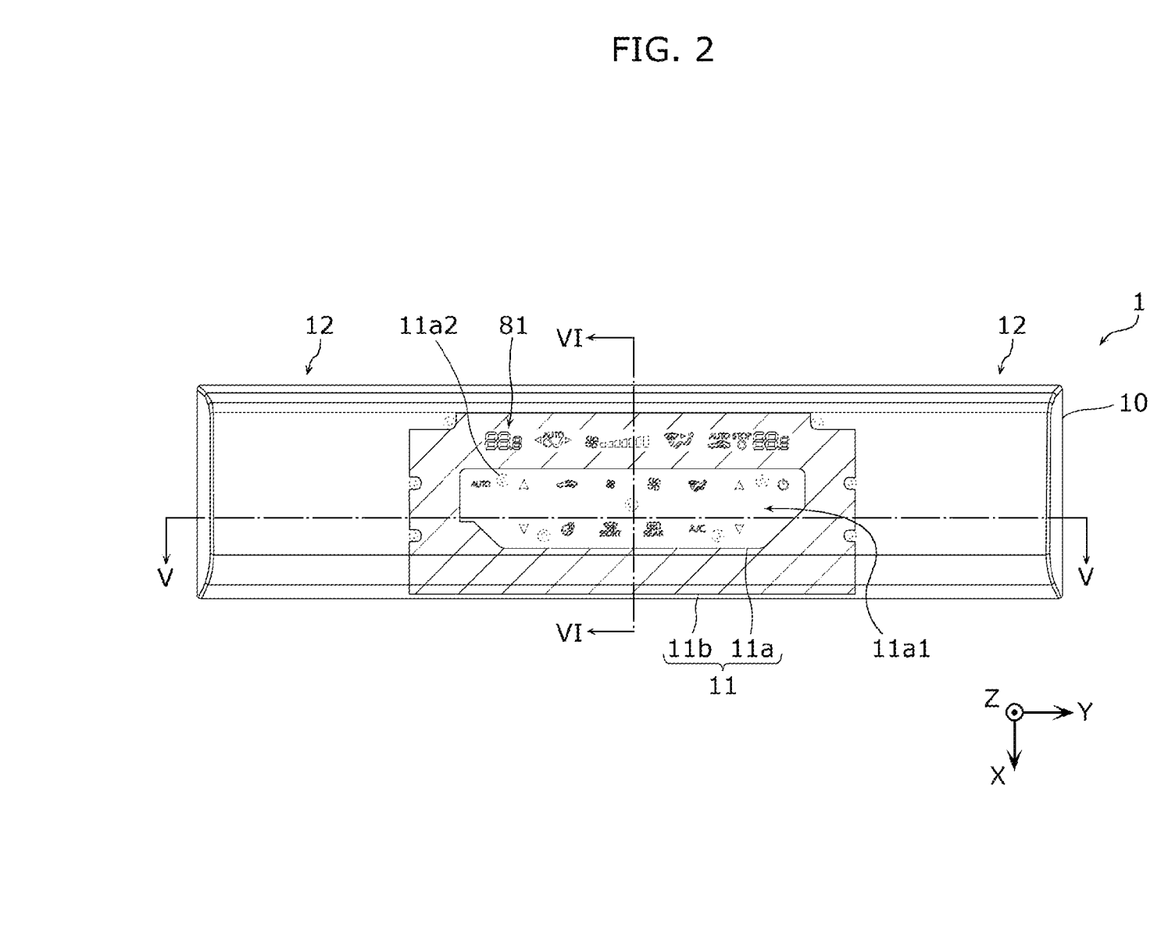
FIG. 2 is a plan view showing the configuration of the input device according to the embodiment.
Figure 3:
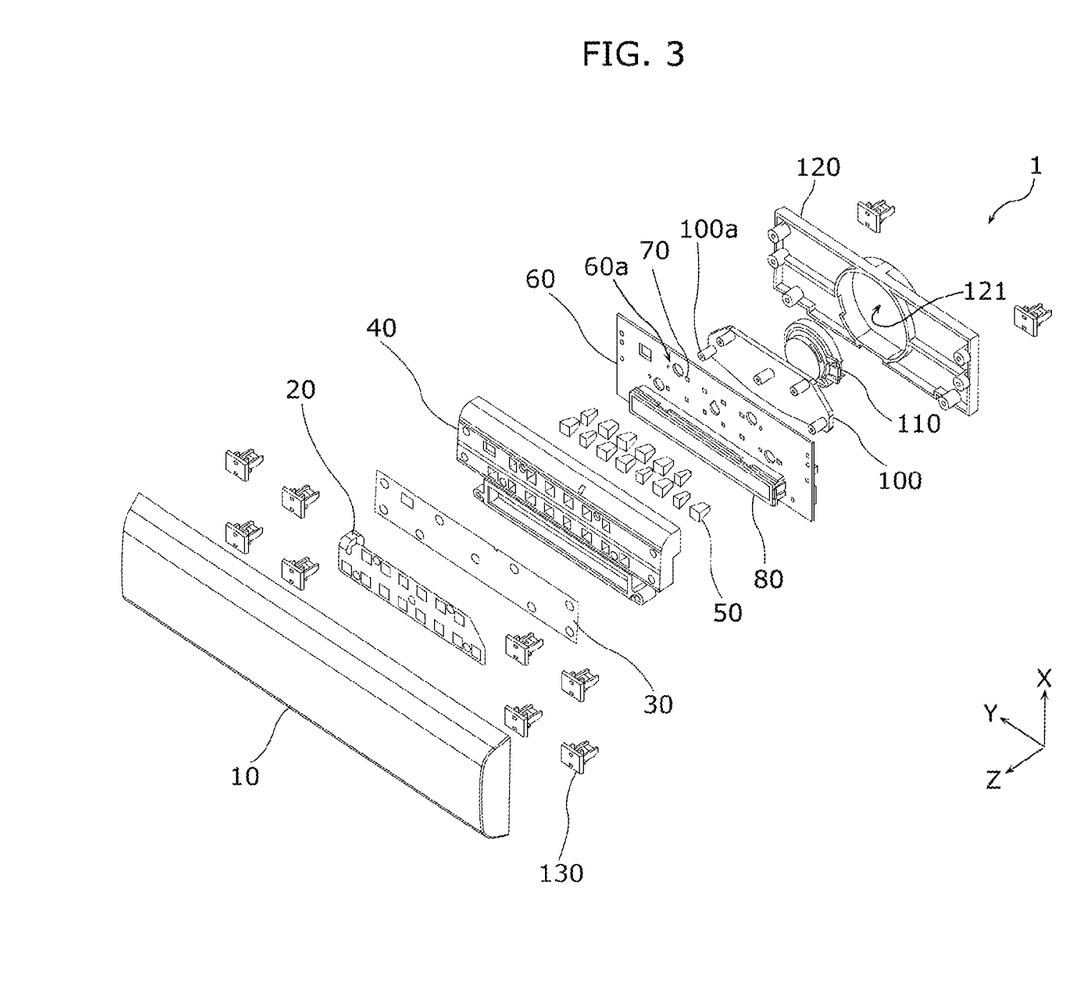
FIG. 3 is an exploded perspective view showing the configuration of the input device according to the embodiment.

An input device according to the present embodiment will be described with reference to FIGS. 1 to 7. FIG. 1 is a perspective view showing a configuration of input device 1 according to the present embodiment. FIG. 2 is a plan view showing the configuration of input device 1 according to the present embodiment. FIG. 3 is an exploded perspective view showing the configuration of input device 1 according to the present embodiment. It should be noted that second portion 11b is hatched for identification, in FIG. 2.

As shown in FIG. 1, input device 1 receives input of an operation for controlling an apparatus included in a body (a vehicle such as a car, for example) on which input device 1 is mounted. Specifically, input device 1 accepts a push-in operation (hereinafter, also referred to as a pressing operation or simply as an operation) on a surface of panel 10 from a user. Input device 1 may be placed on an armrest, a console, an instrument panel, and the like.

When the body is a vehicle, the apparatus is an in-vehicle apparatus, such as a car navigation system, an audio apparatus for playing optical discs, a video reproducing apparatus, an air conditioning apparatus, and the like, but is not limited to them.

It should be noted that the body on which input device 1 is mounted is not limited to a vehicle. Input device 1 only needs to be mounted on a body that accepts operations from a user, and may be mounted on a home appliance, for example.

Figure 7:
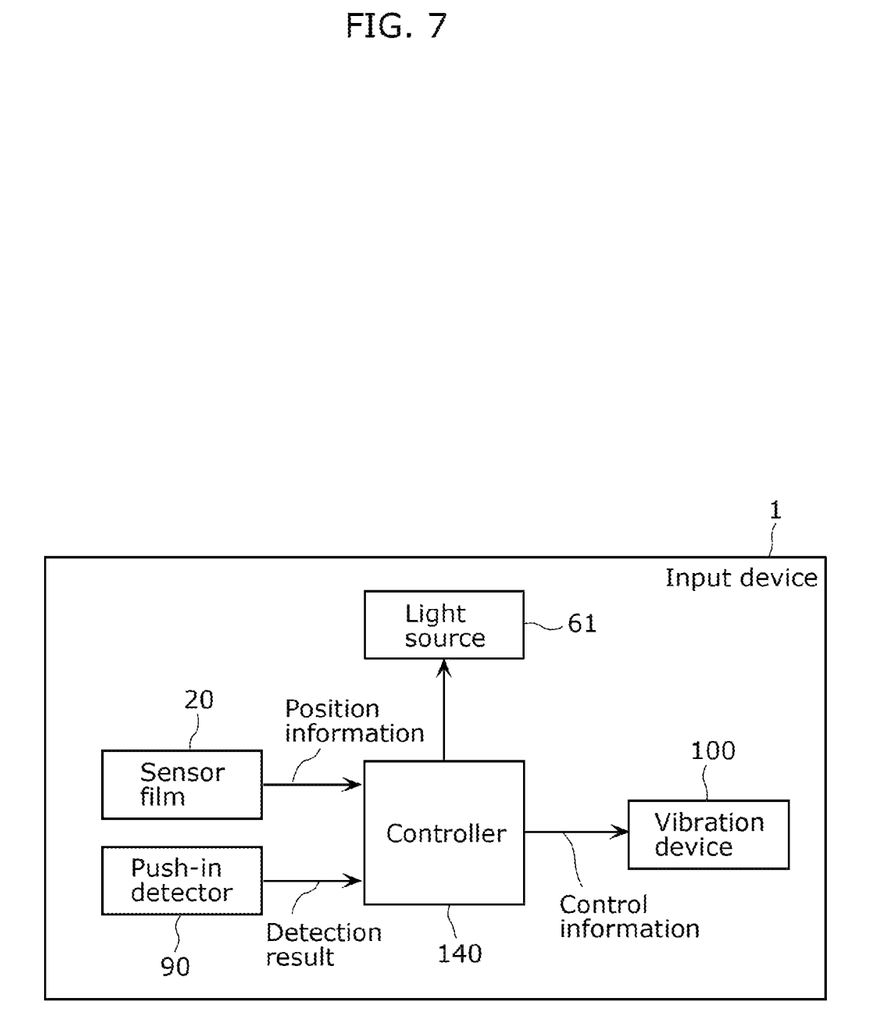
FIG. 7 is a block diagram showing a functional configuration of the input device according to the embodiment.

As shown in FIGS. 1 to 3, input device 1 includes panel 10, sensor film 20, diffusion sheet 30, light guide holder 40, light guide 50, substrate 60, light emitting element 70, display 80, push-in detector 90 (see FIG. 7), holder 100, vibration device 110, cover 120, clip 130, and controller 140 (see FIG. 7). In input device 1, panel 10, sensor film 20, diffusion sheet 30, light guide holder 40 in which light guide 50 is accommodated, substrate 60, holder 100, vibration device 110, and cover 120 are stacked in this order. Push-in detector 90 and controller 140 will be described later with reference to FIG. 7.

Panel 10 is a user interface that has a surface (a surface in a plus side of the Z axis) on which predetermined design 11a1 is displayed, and is used for accepting operations from a user. Specifically, panel 10 accepts a pressing operation from a finger of the user. A user can control apparatuses included in a vehicle by operating panel 10 (specifically, first portion 11a of operator 11). Panel 10 is, for example, a plate-shaped member in a plan view, and is pressed through the operation by a user. The finger of a user is an example of an operating body. It should be noted that the operating body is not limited to the finger of a user, and may be any electrically conductive body.

In the present embodiment, panel 10 is formed of a material that has a light transmittance property. Panel 10 is formed of, for example, a transparent resin such as polycarbonate, or a light-transmissive elastomer, but is not limited to them.

Panel 10 has operator 11 and decorated part 12 in the plan view. Operator 11 and decorated part 12 are integrally formed. In other words, no gap is formed between operator 11 and decorated part 12 in the plan view. Operator 11 is a part that functions as an input device, and decorated part 12 is a part configured as a decorated panel. It should be noted that operator 11 and decorated part 12 may be decorated.

In the present specification, integral formation means that at least one of: each component is formed of the same material; each component is formed simultaneously; and each component is the same body (single body), is established.

Operator 11 is a switch part that functions as a switch in input device 1. In other words, the switch part of input device 1 is a section where design 11a1 is displayed. A user operates a design part corresponding to an apparatus which the user intends to control, to thereby control the apparatus. In this embodiment, operator 11 has the light transmittance property.

Although details will be described later, operator 11 includes first portion 11a and second portion 11b, in the plan view. In first portion 11a, one or more designs 11a1 for operation are displayed. Second portion 11b is arranged around first portion 11a. In second portion 11b, designs 11a1 for the operation are not displayed. Second portion 11b is configured to have more flexibility than first portion 11a. Furthermore, second portion 11b may have more flexibility than decorated part 12, for example. First portion 11a also functions as a portion on which the pressing operation is performed by a user to implement a desired function.

In the present embodiment, a plurality of designs 11a1 are displayed on first portion 11a. The number of designs 11a1 is not particularly limited as long as the number is one or more.

In the example shown in FIG. 2, second portion 11b is provided so as to seamlessly cover first portion 11a from its outside in the plan view, but second portion 11b is not limited thereto.

Decorated part 12 is a portion to which a desired decoration has been applied, and is a non-switch part that does not function as the switch in input device 1. Even if a user operates decorated part 12, no apparatus is controlled. Decorated part 12 is arranged in line with operator 11 in the plan view. In the example shown in FIG. 1, decorated part 12 is arranged to sandwich operator 11 from the left and right. It can also be said that decorated part 12 is an area that the user does not operate for the purpose of controlling apparatuses. Design 11a1 is not displayed on decorated part 12. Furthermore, decorated part 12 may have a light blocking property.

Figure 4:
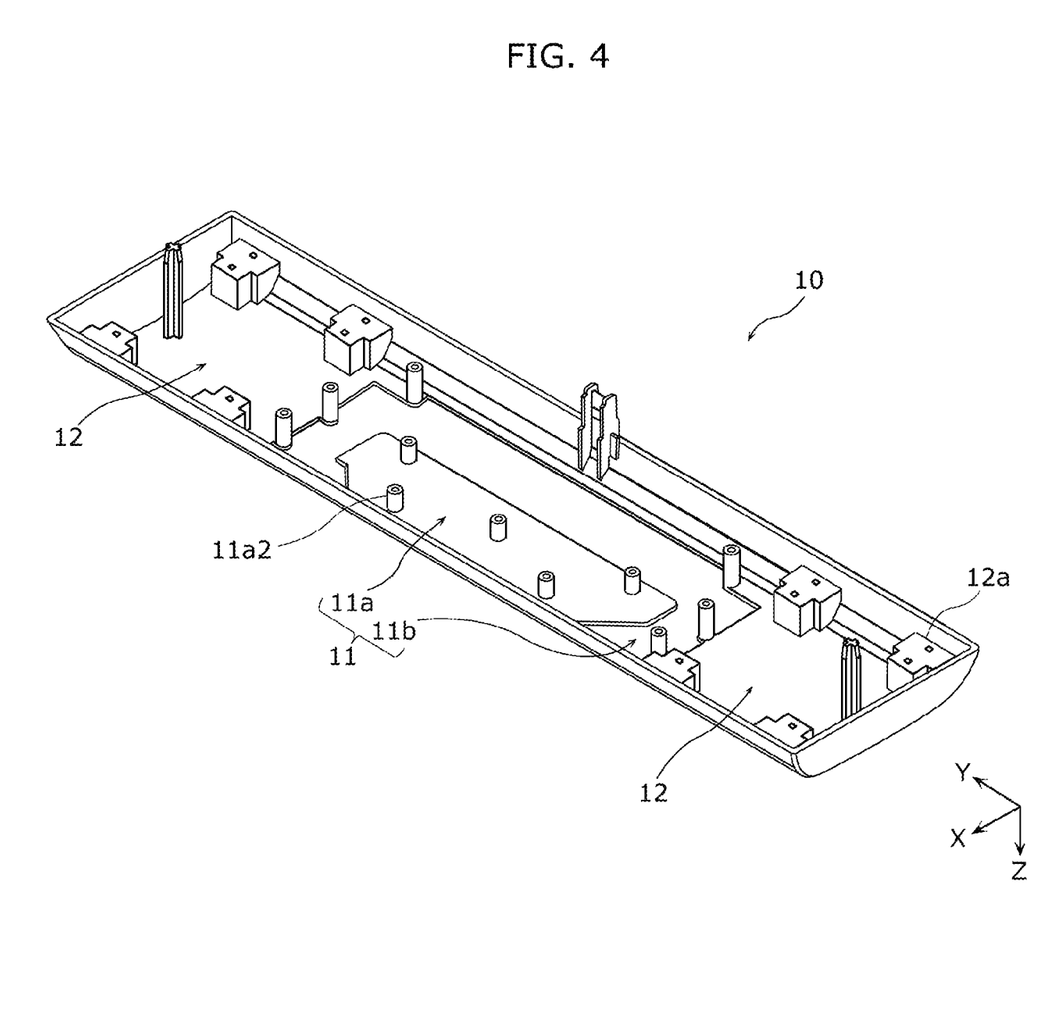
FIG. 4 is a perspective view showing a panel according to the embodiment, which is viewed from a back side.

Here, a configuration of panel 10 will be further described with reference to FIG. 4. FIG. 4 is a perspective view showing panel 10 according to the present embodiment, which is viewed from a back side (a minus side of the Z axis).

As shown in FIG. 4, second portion 11b of operator 11 has a structure that is more flexible than first portion 11a, and has a thickness (length in the Z-axis direction) smaller than that of first portion 11a. In addition, second portion 11b is thinner than, for example, decorated part 12.

First portion 11a is provided with ribs 11a2 that protrude in the minus direction of the Z axis. Each rib 11a2 is connected to a corresponding one of ribs 100a that are provided on holder 100 and protrude in the plus direction of the Z axis, which will be described later. For example, a hole is provided in each rib 11a2, and a penetrating hole is provided in each rib 100a. Through the holes and the penetrating holes, panel 10 and holder 100 may be fixed to a fastening member (a screw, for example).

Each rib 11a2 is provided in a region that does not overlap with a plurality of designs 11a1 in the plan view. Ribs 11a2 are provided, for example, near the respective four corners of first portion 11a and the vicinity of the center of first portion 11a in the plan view. With this configuration, the periphery and the center of first portion 11a of operator 11 can be vibrated in the same manner. Furthermore, ribs 11a2 are not provided in second portion 11b. Each rib 11a2 is an example of an engaging part. Here, the vicinity of the center is, for example, a region that includes the center of gravity of first portion 11a in the plan view and is 20% or less of the area of first portion 11a, but is not limited thereto. Further, other ribs 11a2 may be arranged so as to surround rib 11a2 in the vicinity of the center in the plan view.

Attachment part 12a to which clip 130 is attached is arranged in decorated part 12.

In input device 1 including such panel 10, stimulation is applied to a tactile force sensation of a user while the user operates operator 11. Such stimulation is, for example, mainly embodied by operator 11. In other words, decorated part 12 may not generate such stimulation, for example. It should be noted that the stimulation is vibration in a direction perpendicular to the plane.

Referring again to FIGS. 2 and 3, sensor film 20 detects an operation position of a user with respect to a plurality of designs. Specifically, sensor film 20 is provided between panel 10 and diffusion sheet 30, and is a sensor for detecting the position where a user has operated (pressed) panel 10 (first portion 11a).

In the present embodiment, sensor film 20 is an electrostatic capacity type sensor film (electrostatic sensor film) having the light transmittance property. Sensor film 20 is arranged in a region overlapping with at least first portion 11a in the plan view. Sensor film 20 is provided individually for each of a plurality of designs 11a1 in the plan view, and has an electrode (sensor electrode) for detecting the operation position (which design has been operated).

When only one design 11a1 is displayed on first portion 11a, sensor film 20 may not be provided.

Diffusion sheet 30 is arranged between sensor film 20 and light guide holder 40 and diffuses light that passes through light guide 50 toward panel 10. Diffusion sheet 30 is composed of a light-transmissive resin plate (a polycarbonate plate, for example), a polyethylene terephthalate (PET) film, and the like containing inorganic fine particles such as silica and glass beads, or light-diffusing particles such as resin particles.

It should be noted that diffusion sheet 30 only needs to be placed between panel 10 and light guide holder 40, and may be placed between panel 10 and sensor film 20, for example. Alternatively, diffusion sheet 30 may not be provided.

Light guide holder 40 is a plate-shaped member provided between diffusion sheet 30 (or sensor film 20) and substrate 60. Light guide holder 40 has rigidity. Light guide holder 40 is made of a resin material, but is not limited thereto.

Light guide holder 40 is arranged in a region overlapping with at least first portion 11a, and is arranged, for example, in a region overlapping with operator 11, in the plan view. Furthermore, light guide holder 40 is not mechanically connected to holder 100. It should be noted that mechanical connection means that holder 100 is configured (connected) to move when holder 100 moves in the Z-axis direction. Even if holder 100 moves in the Z-axis direction, light guide holder 40 does not move in the Z-axis direction due to the movement of holder 100.

Penetrating holes are provided in light guide holder 40 to transmit light from a light source (light emitting element 70, for example). The penetrating holes are provided, for example, in respectively correspondence with a plurality of light emitting elements 70 (for example, on a one-to-one basis) included in the light source. In addition, the penetrating holes are provided in correspondence with design 11a1 of operator 11, for example. Light is transmitted through the penetrating holes. Accordingly, it can be said that light guide holder 40 has the light transmittance property.

Each light guide 50 is accommodated in the corresponding one of the penetrating holes of light guide holder 40 and guides light from the light source toward panel 10. Light guides 50 are made of, for example, a resin material, but is not limited thereto. Furthermore, light guides 50 may have the light blocking property.

It should be noted that light guide 50 may not be provided. In other words, light from the light source may pass through the penetrating holes (spaces) in light guide holder 40.

Substrate 60 is a plate-shaped member that is arranged on a back surface (a surface in the minus side of the Z axis) side of panel 10. On substrate 60, a plurality of light emitting elements 70 are provided. In the present embodiment, display 80 is further arranged on a front surface (a surface in the plus side of the Z axis) of substrate 60. Substrate 60 is a rigid substrate, but may be a flexible substrate. Substrate 60 is, for example, a glass substrate or a resin substrate, but is not limited thereto.

Furthermore, substrate 60 has first detection electrode 62 (see FIG. 6) on the back surface (the surface in the minus side of the Z axis) for detecting an operation from a user. First electrode 62 is provided to face holder 100, and is, for example, a solid pattern electrode (solid electrode) provided to face second electrode 101 included in holder 100. First electrode 62 is made of, for example, copper or silver, but is not limited thereto. It should be noted that first electrode 62 may be provided on the front surface (the surface in the plus side of the Z axis) of substrate 60.

Substrate 60 is arranged in a region overlapping with at least first portion 11a and is arranged in, for example, a region overlapping with operator 11, in the plan view. It should be noted that substrate 60 is not mechanically connected to holder 100. Substrate 60 is formed with penetrating holes 60a through which ribs 100a of holder 100 are respectively inserted. Even if holder 100 moves in the Z-axis direction, substrate 60 does not move in the Z-axis direction due to the movement of holder 100. In other words, even if holder 100 moves in the Z-axis direction, the position of first electrode 62 does not change. It should be noted that ribs 11a2 may be respectively inserted in penetrating holes 60a.

Substrate 60 is connected to ground. The ground refers to a reference conductive portion having a reference potential of substrate 60 or the reference potential itself. The reference potential is, for example, 0V (zero volt), but is not limited thereto.

Although the details will be described later, push-in detector 90 detects the electrostatic capacity between first electrode 62 and second electrode 101 in the present embodiment. Specifically, push-in detector 90 detects an operation of a user based on change in the electrostatic capacity between first electrode 62 and second electrode 101. First electrode 62 and second electrode 101 are electrodes for push-in detector section 90 to detect an operation of a user based on the change in electrostatic capacity. Push-in detector 90 is an example of the electrostatic capacity detector. It should be noted that a detection method by push-in detector 90 will be described later with reference to FIG. 6.

Light emitting element 70 is mounted on the surface (the surface in the plus side of the Z axis) of substrate 60 and emits light for displaying design 11$a$1. A plurality of light emitting elements 70 are provided in a region overlapping with operator 11 in the plan view. Specifically, light emitting element 70 is provided in a region overlapping with each of a plurality of designs 11$a$1. Light emitting element 70 is arranged, for example, at each position on substrate 60, which faces the corresponding one of the plurality of designs 11$a$1. Light emitting element 70 is, for example, a light emitting diode (LED), but is not limited thereto.

The plurality of light emitting elements 70 may emit light of mutually different colors (a color according to design 11$a$1, for example), or may emit light of a single color (white, for example).

Display 80 is arranged on the front surface of substrate 60 (the surface in the plus side of the Z axis), and displays a status of an apparatus, and the like (status display 81 shown in FIG. 2, for example). Display 80 is provided so as to be able to display status display 81 in a region overlapping with second portion 11$b$ in the plan view. Display 80 is embodied by a liquid crystal display device, an organic electro luminescence (EL) display device, or the like. It should be noted that display 80 may not be provided.

Holder 100 is arranged on the back surface side of panel 10 and is mechanically connected to each of panel 10 and vibration device 110. It can also be said that holder 100 engages with (joins) panel 10. Holder 100 has a function of transmitting vibrations generated by vibration device 110 to panel 10. Furthermore, when the pressing operation is performed on the panel 10, holder 100 is movable relative to substrate 60 (movable toward the minus side of the Z axis in the example of FIG. 3). When the pressing operation on panel 10 is released, holder 100 is movable relative to substrate 60 (movable to the plus side of the Z axis in the example of FIG. 3).

Holder 100 has ribs 100$a$ that protrude from a surface of a plate portion toward the plus side of the Z axis. Ribs 100$a$ are respectively connected to ribs 11$a$2, and are configured to be able to directly transmit vibrations generated by vibration device 110 to operator 11 (specifically, first portion 11$a$). With this configuration, holder 100 and first portion 11$a$ vibrate together in the direction perpendicular to the plane, for example. Rib 100$a$ is an example of the engagement portion.

Input device 1 is configured to cause each rib 100$a$ and a corresponding one of ribs 11$a$2 to engage with each other at a plurality of locations on first portion 11$a$ in the plan view. For example, as shown in FIG. 2, one of the plurality of locations is provided at the center of first portion 11$a$ in the plan view, and one or more of the other locations are provided along a border between first portion 11$a$ and second portion 11$b$.

Holder 100 is made of a material that has rigidity and conductivity. Holder 100 is made of metal. Holder 100 is made of aluminum, aluminum alloy, copper, copper alloy, magnesium, magnesium alloy, or the like. It should be noted that having the rigidity means having such a level of the rigidity that holder 100 does not substantially deform when first portion 11$a$ is pressed and holder 100 moves downward. For example, holder 100 may have more sufficient rigidity than second portion 11$b$ in operator 11 of panel 10, and may further have more sufficient rigidity than first portion 11$a$ in operator 11 of panel 10. Holder 100 is also called an exciter bracket.

Holder 100 is connected to ground. The ground refers to a reference conductive portion having a reference potential of holder 100 or the reference potential itself. The reference potential is, for example, 0V (zero volt), but is not limited thereto. Second electrode 101 is connected to a common ground with first electrode 62, for example.

It should be noted that holder 100 is not limited to being formed of metal. For example, holder 100 may be formed of a plate portion having rigidity and an insulation property, and a metal layer formed on a surface of the plate portion. The plate portion is a resin plate made of a resin having the rigidity and the insulating property, and may be made of, for example, engineering plastic. Furthermore, the metal layer may be a thin film formed by metal plating, for example.

Vibration device 110 stimulates a user's sensation of tactile force while the user operates first portion 11$a$ of operator 11. Vibration device 110 is mechanically connected to holder 100 and generates vibration in the direction perpendicular to the surface of panel 10 (in the Z-axis direction) when push-in detector 90 detects that panel 10 is pressed. Vibration device 110 may be able to control at least one of the frequency and vibration intensity of the vibration in the direction perpendicular to the plane, for example. Vibration device 110 is an example of an actuator. Furthermore, being mechanically connected to holder 100 is an example of being held by holder 100.

Vibration device 110 is configured to include a vibrator that generates vibration. The vibrator may be, for example, a piezoelectric element made of a piezoelectric material, or may be a structure that operates in an electromagnetic manner, such as a motor, a solenoid, or a voice coil. Furthermore, the vibrator may be a linear resonant actuator, an artificial muscle, a shape memory actuator, or the like.

Vibration device 110 is arranged between holder 100 and cover 120 at a position overlapping with operator 11 (specifically, first part 11$a$) in the plan view. Vibration device 110 is arranged, for example, in the vicinity of the center of operator 11 in the plan view.

Cover 120 has recess 121 that accommodates vibration device 110, and covers panel 10 from below (from the minus side of the Z axis).

Cover 120 and substrate 60 are fixed to decorated part 12 of panel 10 using, for example, a fastening member. Furthermore, holder 100 and vibration device 110 are arranged between cover 120 and substrate 60. For example, cover 120 and substrate 60 are fixed with an interval that allows holder 100 and vibration device 110 to vibrate in a direction perpendicular to the plane.

Clip 130 is a fixing member for fixing input device 1 to another member. In the present embodiment, clip 130 is arranged on the back surface side of each of panel 10 and cover 120.

Figure 5:
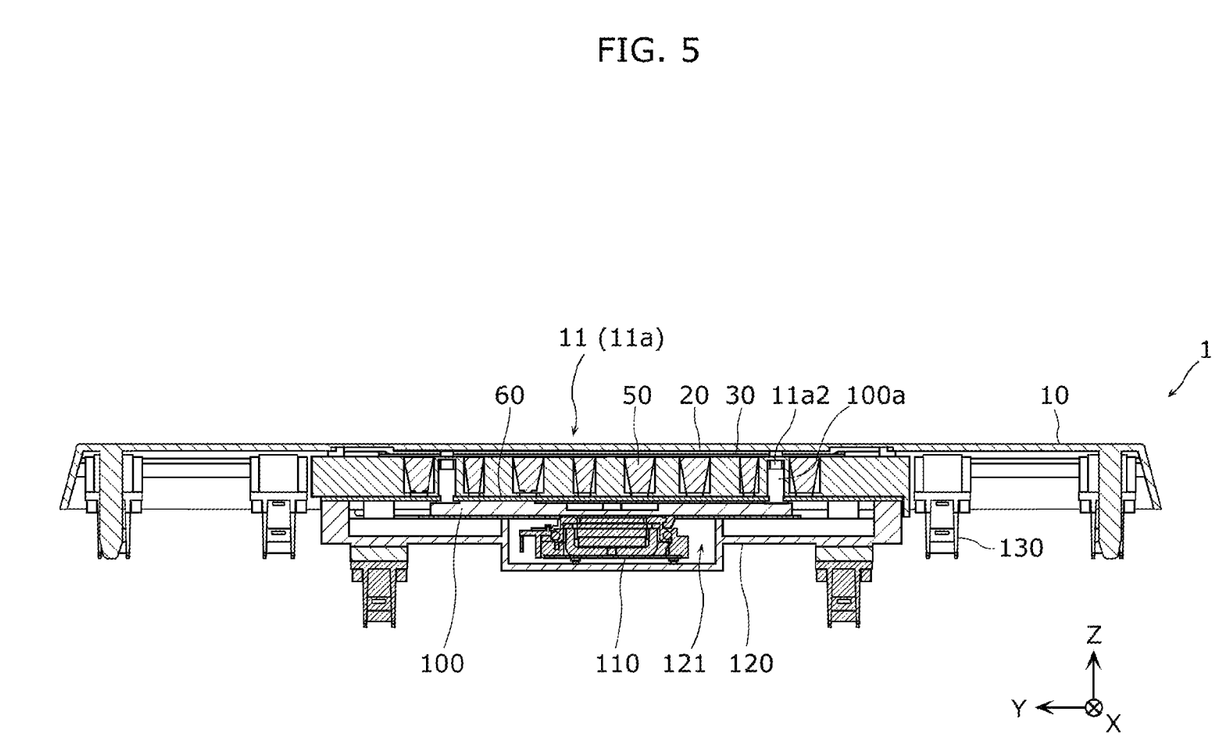
FIG. 5 is a cross-sectional view showing the input device according to the embodiment, which is taken along the cutting line V-V in FIG. 2.
Figure 6:
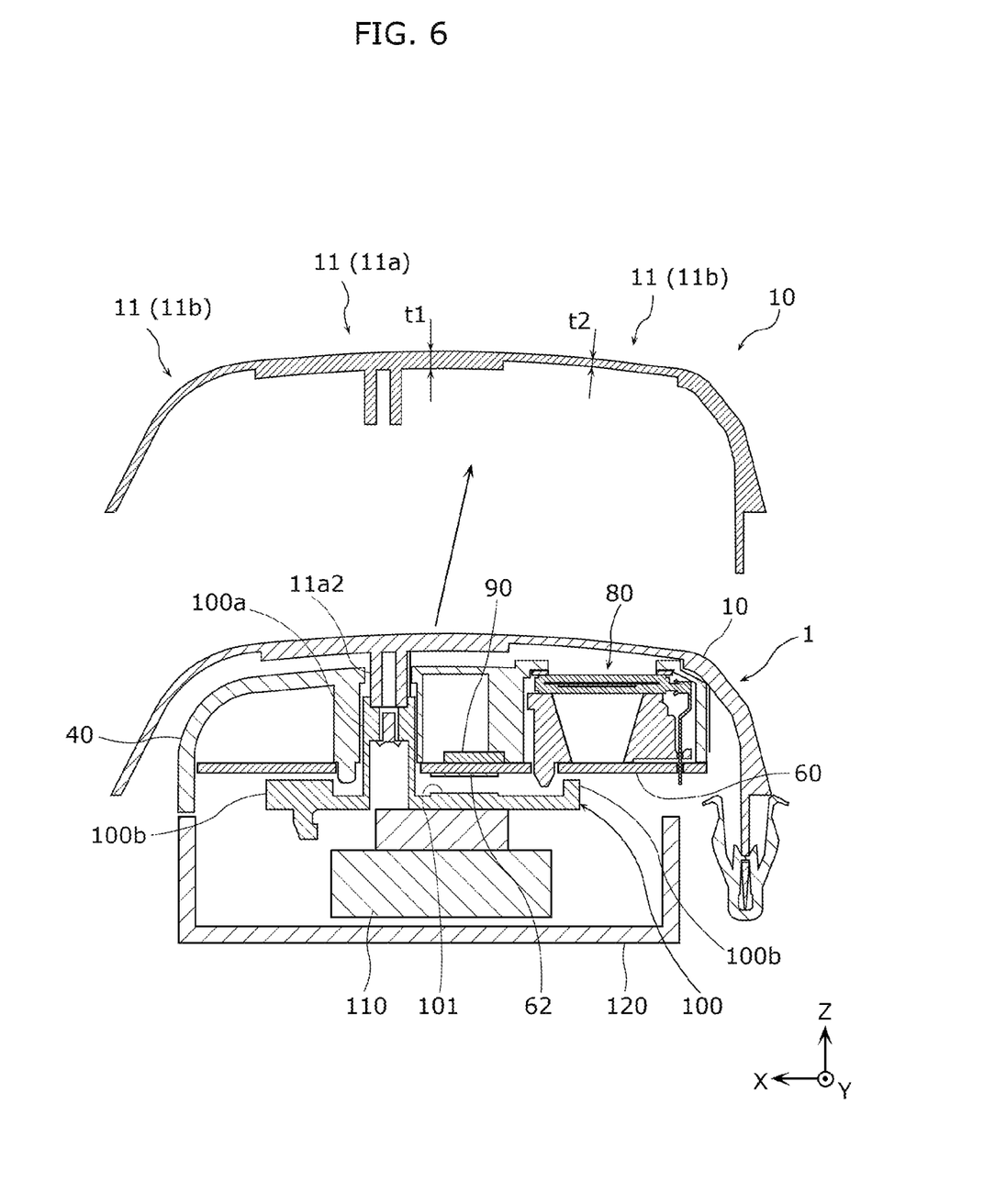
FIG. 6 is a cross-sectional view schematically showing the input device according to the embodiment, which is taken along the cutting line VI-VI in FIG. 2.

Here, the cross-sectional configuration of input device 1 configured as described above will be further described with reference to FIGS. 5 and 6. FIG. 5 is a cross-sectional view of input device 1 according to the present embodiment, which is taken along the cutting line V-V in FIG. 2. FIG. 6 is a cross-sectional view schematically showing input device 1 according to the present embodiment, which is taken along the cutting line VI-VI in FIG. 2. It should be noted that FIG. 6 shows, for convenience, a sectional view of input device 1 in a lower part of the sheet, and a sectional view of panel 10 is shown in an upper part of the sheet. Furthermore, in FIG. 6, illustrations of sensor film 20, diffusion sheet 30, and the like are omitted.

As shown in FIGS. 5 and 6, holder 100 is directly connected to operator 11 (specifically, first portion 11a) of panel 10. Furthermore, as shown in FIG. 6, first portion 11a is thicker than second portion 11b. In other words, second portion 11b is thinner than first portion 11a. Assuming that the thickness (depth) of first portion 11a is t1 and the thickness (depth) of second portion 11b is t2, thickness t2 may be thinner than thickness t1, may be 70% or less of thickness t1, may be 50% or less of thickness t1, or may be 30% or less of thickness t1, for example. Thickness t1 and thickness t2 are appropriately determined depending on the performance, the intended use, and the like, required for the product. For example, thickness t1 is 2.7 mm, and thickness t2 is 1.3 mm, but they are not limited thereto.

It should be noted that thickness t1 described above is an average value of the thickness of first portion 11a, but may be a median value, mode, a maximum value, a minimum value, a representative value, and the like. Thickness t2 described above is an average value of the thickness of second portion 11b, but may be a median value, mode, a maximum value, a minimum value, a representative value, and the like.

First portion 11a and second portion 11b are, for example, integrally formed of the same material.

In such input device 1, when first portion 11a of operator 11 is pressed, second portion 11b that is provided around first portion 11a and has high flexibility is easily deformed (bent, for example). In other words, a user can operate operator 11 with a weaker pressing force, so that the operability at pressing is improved.

Furthermore, panel 10 has, for example, a partially curved shape. In the example of FIG. 6, both ends of panel 10 in the X-axis direction are curved. In such a case, a curved portion connected to first portion 11a (in the example of FIG. 6, the curved portion in the plus side of the X axis) may be formed thin. This makes it possible to effectively increase the flexibility of the portion that has become hard due to the curved shape.

In such input device 1, when pushing-in is detected by push-in detector 90, vibration device 110 vibrates in a direction perpendicular to the plane, and the vibration is directly transmitted to panel 10 (specifically, to operator 11) via holder 100. In other words, the vibration of vibration device 110 is not transmitted to light guide holder 40, substrate 60, and the like. Therefore, even if vibration device 110 vibrates, light guide holder 40, substrate 60, and the like do not vibrate. Holder 100 relatively vibrates (moves) in a direction perpendicular to the plane with respect to light guide holder 40, substrate 60, and the like.

Since vibration device 110 is connected to panel 10 via holder 100 and other components are not vibrated by vibration device 110, the vibration of vibration device 110 can be effectively transmitted to panel 10.

Furthermore, operator 11 has second portion 11b that is provided around first portion 11a and is more flexible than first portion 11a. Accordingly, operator 11 is easily deformed by force in a direction perpendicular to the plane, such as operation or vibration. In other words, input device 1 can effectively transmit vibrations to a user. Furthermore, decorated part 12 has lower flexibility than second portion 11b, to thereby prevent vibrations by vibration device 110 from being transmitted to decorated part 12 (vibration to first portion 11a becomes weaker).

Here, the configuration in which second portion 11b is more flexible than first portion 11a is not limited to second portion 11b being thinner than first portion 11a. For example, second portion 11b may be made of a material that has more flexible than that of first portion 11a. For example, second portion 11b may contain a more flexible material than first portion 11a contains. For example, first portion 11a may be formed of a first resin such as polycarbonate, and second portion 11b may be formed of an elastomer or a second resin (flexible resin) that is more flexible than the first resin. In such a case, panel 10 may be formed by two-color molding, for example. In this case, thickness t1 and thickness t2 may be equal.

As shown in FIG. 6, holder 100 includes second electrode 101 and protruding portion 100b.

Second electrode 101 is a solid electrode provided at a portion facing first electrode 62. Second electrode 101 is provided to protrude from a front surface (a surface in the plus side of the Z axis) of holder 100, for example, but is not limited thereto and may be flush with the front surface.

Holder 100 moves in the Z-axis direction when first portion 11a is pressed. That is, second electrode 101 moves in the Z-axis direction.

In the example of FIG. 6, second electrode 101 constitutes a part of holder 100, and a plate shaped part of holder 100 and second electrode 101 are integrally formed. This means that formation of second electrode 101 on the surface of holder 100 is not performed by printing or the like. The plate portion of holder 100 and second electrode 101 are made of the same material.

Protruding portion 100b protrudes toward substrate 60 (the plus side of the Z axis) from an end of the plate portion in an X-axis side. Protruding portion 100b is provided to have a predetermined distance from the back surface of substrate 60 in a state where panel 10 is not operated, but may be in contact with substrate 60 (non-conductive portion of substrate 60), for example. Furthermore, protruding portion 100b has a higher height (length in the Z-axis direction) than second electrode 101.

As described above, holder 100 is configured to cover, with ribs 100a and protruding portion 100b, second electrode 101 from its back surface side (the minus side of the Z axis), in the cross-sectional view shown in FIG. 6. In addition, protruding portion 100b and ribs 100a are provided to cover one side of first electrode 62 (a side in the plus side of the X axis). Holder 100 is configured to cover the electrodes (first electrode 62 and second electrode 101).

Here, detection of a pressing operation by push-in detector 90 will be described with reference to FIG. 6. It should be noted that push-in detector 90 is an integrated circuit that detects change in electrostatic capacity between first electrode 62 and second electrode 101, for example.

As shown in FIG. 6, ribs 11a2 and 100a are engaged. Accordingly, when first portion 11a is pressed downward (the minus side of the Z axis), holder 100 moves downward accordingly. Here, substrate 60 is not engaged with panel 10 and holder 100. Accordingly, holder 100 moves relative to substrate 60 (moves downward) when the pressing operation is performed on the panel 10.

Push-in detector 90 detects, based on change in electrostatic capacity, that first electrode 62 and second electrode 101 are separated by a predetermined distance or more due to the downward movement of holder 100. Push-in detector 90 detects an operation by a user based on the change in electrostatic capacity.

Holder 100 has rigidity. Accordingly, when moving downward, holder 100 moves without being substantially deformed. Holder 100 can move horizontally downward while first electrode 62 and second electrode 101 maintain a parallel relationship regardless of a position where a user performs an operation on first portion 11*a*. Accordingly, it is possible to prevent detection variations from occurring depending on the operation position in first portion 11*a*. Furthermore, holder 100 covers second electrode 101 from below. Accordingly, it is possible to prevent disturbance noise from entering first electrode 62 and second electrode 101.

Next, a functional configuration of input device 1 will be described with reference to FIG. 7. FIG. 7 is a block diagram showing a functional configuration of input device 1 according to the present embodiment.

As shown in FIG. 7, input device 1 includes sensor film 20, light source 61, push-in detector 90, vibration device 110, and controller 140, as a configuration including functional configurations.

Light source 61 includes substrate 60 and light emitting element 70, is placed on the back surface side of panel 10, and is a light source for causing panel 10 to display a design for an operation, for example.

Push-in detector 90 detects that a user has operated first portion 11*a*. Push-in detector 90 is provided on the back surface side of panel 10. Specifically, push-in detector 90 is arranged, for example, on substrate 60, and is configured to detect an operation from the user based on the electrostatic capacity as described above when a load above a certain level is applied to operator 11. In other words, push-in detector 90 is a detection circuit in an electrostatic capacity sensor. In FIG. 6, push-in detector 90 is provided on a surface of substrate 60, which is opposite to the surface on which first electrode 62 is provided, but may be arranged on the same surface.

Controller 140 controls each component in input device 1. Controller 140 controls light source 61 to emit light, thereby causing design 11*a*1 to be displayed. Furthermore, controller 140 determines which design 11*a*1 has been operated by a user based on information from sensor film 20 regarding a position where the operation is performed, and performs processing related to control according to operated design 11*a*1.

When obtaining, from push-in detector 90, a detection result indicating that a user has operated operator 11, controller 140 outputs control information for vibrating vibration device 110. It can also be said that controller 140 controls the vibration of vibration device 110 based on the output of push-in detector 90. For example, controller 140 obtains that operator 11 is operated by a user from the detection result of push-in detector 90, and obtains a position at which the user performs the operation (which design 11*a*1 was operated) from information relating to the operation position from sensor film 20. Then, controller 140 outputs a control signal according to design 11*a*1 operated by the user to the outside. Furthermore, controller 140 may cause vibration device 110 to vibrate in a manner (e.g., frequency, vibration intensity, and the like) according to design 11*a*1 operated by the user. It should be noted that controller 140 may cause vibration device 110 to vibrate in a single manner (e.g., frequency, vibration intensity, and the like) regardless of which design 11*a*1 is operated.

Controller 140 is embodied by a processor that executes a program for controlling each component and memory that stores the program, for example. The processor reads and executes software (program) recorded in the memory, to thereby implement each function of controller 140. Furthermore, controller 140 may be embodied by a dedicated circuit. Still furthermore, controller 140 is mounted on substrate 60, for example.

Variation 1 of Embodiment

Figure 8:
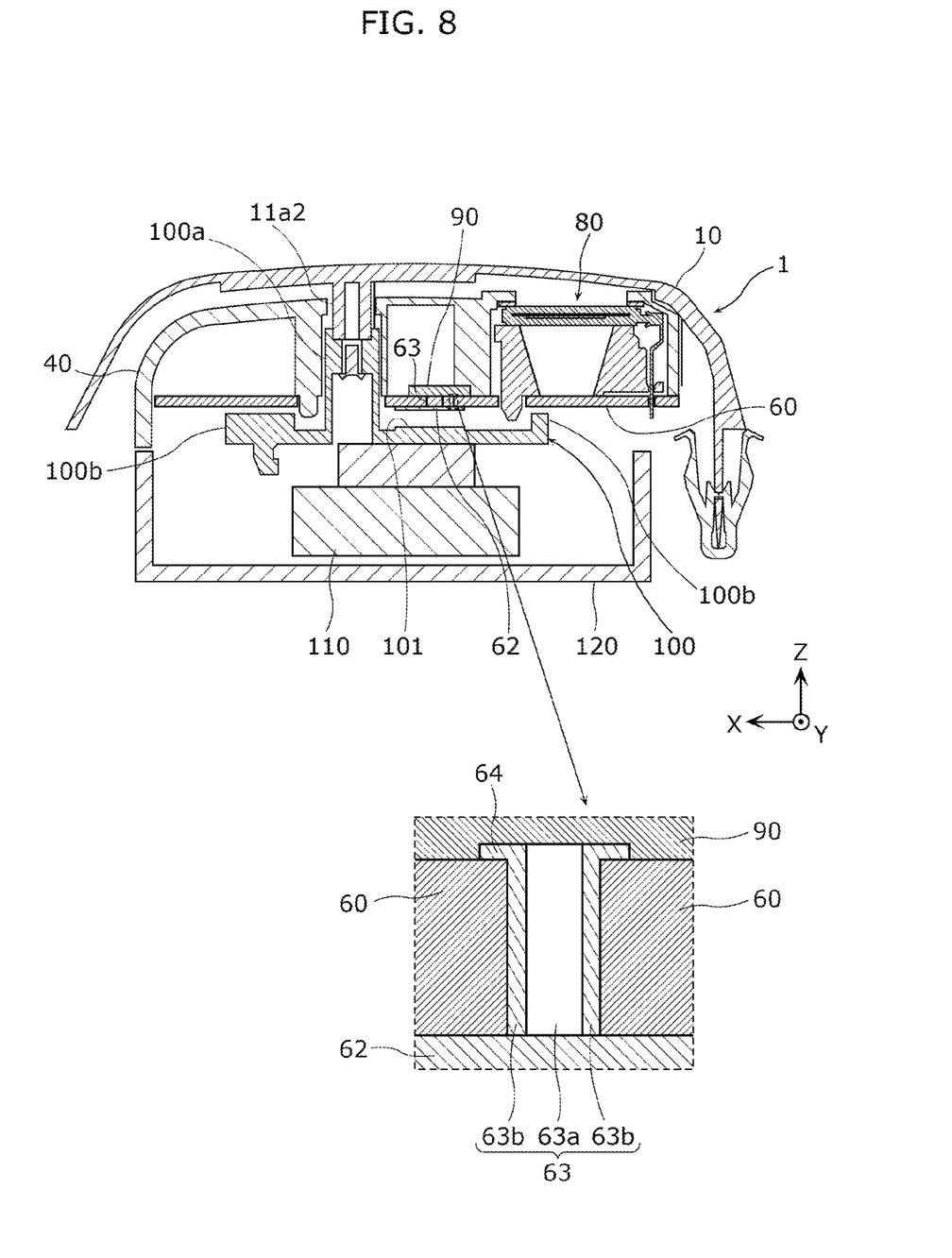
FIG. 8 is a cross-sectional view schematically showing the input device according to Variation 1 of the embodiment, which is taken along a cutting line corresponding to the cutting line VI-VI in FIG. 2.

Hereinafter, an input device according to the present variation will be described with reference to FIG. 8. It should be noted that the following description will focus on differences from the embodiment, and the description of contents that are the same or similar to the embodiment will be omitted or simplified. FIG. 8 is a cross-sectional view schematically showing input device 1 according to the present variation, taken along a cutting line corresponding to the cutting line VI-VI in FIG. 2. Input device 1 according to the present variation is different from input device 1 according to the embodiment in that first electrode 62 and push-in detector 90 are connected (electrically connected) via through hole 63.

As shown in FIG. 8, in input device 1 according to the present variation, push-in detector 90 is arranged on a front surface (a surface in the plus side of the Z axis) of substrate 60, and first electrode 62 is arranged on a back surface of substrate 60. In other words, input device 1 is configured so that at least a part of first electrode 62 and at least a part of push-in detector 90 overlap in the plan view. A region where at least a part of first electrode 62 and at least a part of push-in detector 90 overlap in the plan view is also referred to as an overlapping region.

Furthermore, through hole 63 for connecting first electrode 62 and push-in detector 90 is provided in substrate 60 of input device 1 according to the present variation. Through hole 63 is arranged between first electrode 62 and push-in detector 90 in the overlapping region in the plan view in a cross-sectional view shown in FIG. 8, for example. Through hole 63 is arranged, for example, to penetrate substrate 60 in the thickness direction (Z-axis direction). For example, through hole 63 is linear in the cross-sectional view. Furthermore, through hole 63 is arranged to, for example, connect first electrode 62 and push-in detector 90 at a shortest distance.

Although FIG. 8 shows an example in which three through holes 63 are provided in substrate 60, the number of through holes 63 is not particularly limited as long as it is one or more.

Through hole 63 has metal plating layer 63*b* formed on an inner wall of penetrating hole 63*a* that penetrates substrate 60. Metal plating layer 63*b* is continuously formed from one opening to the other opening in penetrating hole 63*a*. With this configuration, the front surface side and the back surface side of substrate 60, which are opposite to each other can be electrically connected with through hole 63. It should be noted that metal plating layer 63*b* is, for example, a copper plating layer, but is not limited thereto. For example, metal plating layer 63*b* may include the same material as first electrode 62.

Furthermore, substrate 60 may be provided with land 64 for mounting push-in detector 90 on the front surface of substrate 60. It should be noted that land 64 may be provided on the back surface of substrate 60.

Further, penetrating hole 63*a* may be filled with a conductor such as a conductive paste. In such a case, a resistance value of through hole 63 can be lowered, and the loss in through hole 63 can be prevented.

Variation 2 of Embodiment

Figure 9:
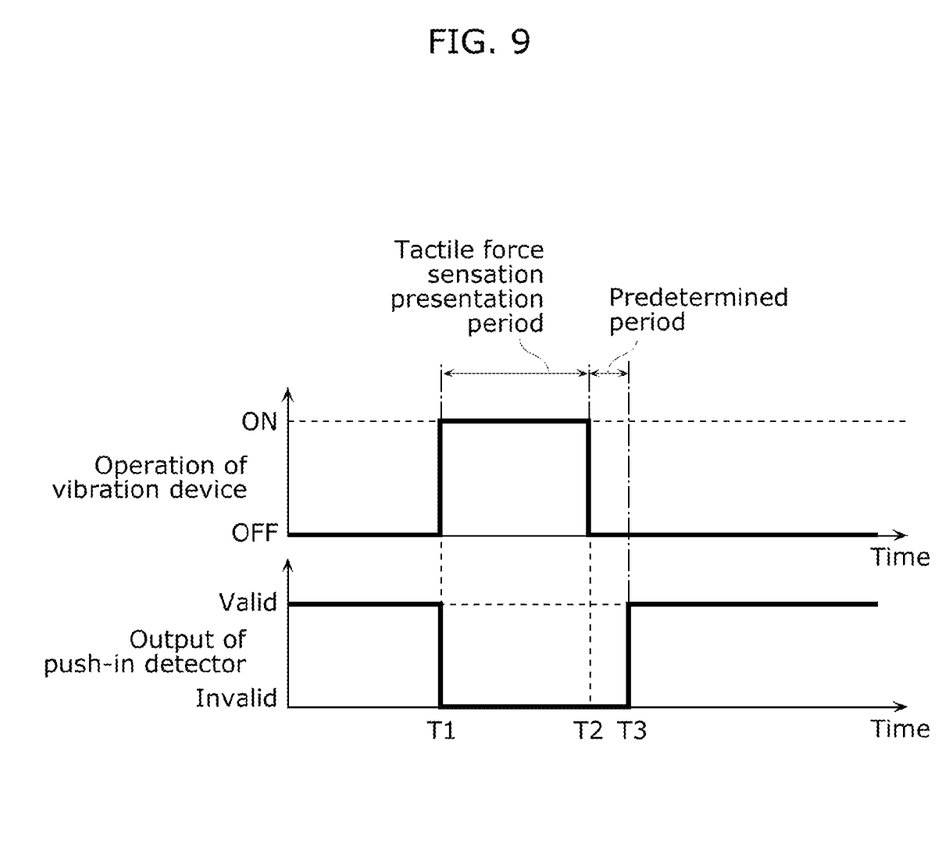
FIG. 9 is a timing chart showing an operation of a vibration device according to Variation 2 of the embodiment and a valid/invalid state of output from a push-in detector.

Hereinafter, an input device according to the present variation will be described below with reference to FIG. 9. It should be noted that the following description will focus on a difference from the embodiment, and the description of contents that are the same or similar to the embodiment will be omitted or simplified. FIG. 9 is a timing chart showing an operation of vibration device 110 according to the present variation and a valid/invalid state of an output of push-in detector 90. Input device 1 according to the present variation differs from input device 1 according to the embodiment in that the output of push-in detector 90 is disabled. It should be noted that vibration device 110 is fixed to holder 100 (see FIG. 6, for example).

Time T1 shown in FIG. 9 is the time when push-in detector 90 starts generating a tactile force sensation. Time T2 is the time when the vibration of vibration device 110 stops. Time T3 is the time when the output of push-in detector 90 switches from the invalid state to the valid state. A period from time T1 to time T2 shown in FIG. 9 is a tactile force sensation presentation period during which vibration device 110 is operating. During the tactile sensation presentation period, the output of push-in detector 90 is maintained in the invalid state.

As shown in FIG. 9, controller 140 disables the output of push-in detector 90 while vibration device 110 is driven (the tactile force sensation presentation period shown in FIG. 9). At time T1, vibration device 110 switches from a stopped state to an operating state, and the output of push-in detector 90 switches from the valid state to the invalid state. For example, controller 140 controls the output of push-in detector 90 to switch from the valid state to the invalid state when vibration device 110 switches from the stopped state to the operating state. The invalid state means that controller 140 ignores the output from push-in detector 90. Ignoring means, for example, that even if a detection result of push-in detector 90 (a detection result indicating that a user has pushed operator 11, for example) is obtained during the tactile force sensation presentation period, controller 140 does not perform any processing according to the detection result.

Controller 140 enables the output of push-in detector 90 at time T3 after a predetermined period has elapsed from time T2. In other words, controller 140 disables the output of push-in detector 90 over the tactile force sensation presentation period and a predetermined period after the tactile force sensation presentation period, from time T1 to T3, for example.

At time T3, when the output of push-in detector 90 becomes valid, controller 140 takes in the output from push-in detector 90. For example, upon obtaining the detection result of push-in detector 90, controller 140 performs processing according to the detection result.

Accordingly, controller 140 does not control the vibration based on the output of push-in detector 90 while vibration device 110 is operating, i.e., while vibration device 110 and holder 100 vibrates together. As a result, input to push-in detector 90 (chattering, for example) based on an unexpected finger movement (an unintended movement, for example) due to vibrations is prevented, and erroneous detection can be prevented.

It should be noted that controller 140 may disable the output of push-in detector 90 at least during the period from time T1 to time T2. The period from time T1 to T2 (tactile force sensation presentation period) is a period during which a tactile force sensation is presented when push-in detector 90 detects an operation by a user (pushing-in), and is a period having a preset length.

Controller 140 may vary the predetermined period depending on a driving mode (vibration condition) of vibration device 110, or may use a fixed period set in advance as the predetermined period. When making the predetermined periods different, a table may be used in which the driving modes of vibration device 110 are respectively associated with the predetermined periods. Controller 140 may for example, calculate the predetermined period based on the driving mode of vibration device 110 and the table. The driving mode of vibration device 110 includes at least one of vibration intensity, a vibration waveform, a vibration period, and the like. The table may be stored in a storage included in input device 1.

The configuration in which controller 140 disables push-in detector 90 is not limited to the configuration in which the output from push-in detector 90 is ignored. Controller 140 may for example, prevent the detection result from push-in detector 90 from being output by cutting off power supply to push-in detector 90.

Although FIG. 9 shows an example in which the predetermined period is shorter than the tactile force sensation presentation period, the predetermined period is not limited to the one in the example. The predetermined period may be set longer or shorter than the tactile force sensation presentation period, or may be set the same as the tactile force sensation presentation period, based on a driving mode of vibration device 110, for example. Furthermore, the predetermined period may be set longer than a period from the time when the operation of vibration device 110 stops (turns OFF) to the time when the vibration stops, or longer than a period until the vibration is attenuated to a level that does not cause erroneous detection.

While vibration device 110 is operating, controller 140 disables the output of push-in detector 90. In addition, controller 140 may also disable the position information from sensor film 20. Disabling the position information means that controller 140 ignores the output (position information) from an integrated circuit (IC) for detecting a touched position using sensor film 20 (a part of the user's body (e.g., a finger), for example). For example, even if a detection result of the IC is obtained during the tactile force sensation presentation period, controller 140 does not perform processing according to the detection result.

Other Embodiments

Although the input device according to one or more aspects has been described above based on the embodiments, the present disclosure is not limited to the embodiments. Unless departing from the spirit of the present disclosure, embodiments obtained by applying various variations that are conceivable by those skilled in the art and embodiments configured by combining structural components of different embodiments may be included within the present disclosure.

For example, in the above embodiments, an example has been described in which the input device includes a panel having the light transmittance property and a light source, but the input device is not limited thereto. For example, the input device may include a panel that does not have the light transmittance property (for example, a panel that has the light blocking property) and may not include the light source. In such a case, the design displayed on the surface of the panel may be embodied by, for example, a printing layer, a sealing layer, and the like, formed by printing on a surface of the panel.

Although an example has been described in which the panel has a rectangular shape in the plan view in the above embodiment, the shape of the panel is not limited to the rectangular shape, and may be circular, trapezoidal, or the like.

Although an example has been described in which the display is provided at a position overlapping with the second portion in the plan view in the above embodiments, the display is not limited to be provided at such a position, and at least a part of the display may be provided at a position overlapping with the first portion.

Although an example in which the input device includes a sensor film has been described in the above embodiment, the embodiments are not limited thereto. For example, if a single design is displayed on the first portion, the input device does not need to include the sensor film.

Although an example has been described in which the plate portion of the holder and the second electrode are integrally formed in the above embodiment, the plate portion and the second electrode may be separate bodies. The separate bodies in the present disclosure refer to at least one of the following: each structural part is formed of different materials; each structural part is formed at different timings; and each structural part is not the same product (a single product).

Although an example has been described in which each of the panel and the holder has ribs for engagement in the above embodiment, it is sufficient that at least one of the panel and the holder has the ribs.

Although an example in which the substrate and the holder are each connected to the ground has been described in the above embodiment, the embodiment is not limited to the example. From a viewpoint of preventing the disturbance noise, it is sufficient that at least the holder is connected to the ground.

Although an example has been described in which the first portion and the second portion have mutually different flexibilities in the above embodiment, the flexibilities may be the same. For example, the first portion and the second portion may be made of the same material and have the same thickness.

Although an example has been described in which the first electrode and the push-in detector are connected via the through hole in Variation 1 of the embodiment described above, the connection type is not limited to this example. The first electrode and the push-in detector may be connected by a combination of wiring and the through hole formed on at least one of the front surface and the back surface of the substrate. Furthermore, the through hole may be arranged in a region different from the overlapping region.

Furthermore, the division of functional blocks in the block diagram is one example. Multiple functional blocks may be embodied as a single functional block, a single functional block may be divided into multiple functional blocks, or some functions may be moved to other functional blocks. In addition, functions of a plurality of functional blocks having similar functions may be processed in parallel or in a time-sharing manner by a single piece of hardware or software.

While various embodiments have been described herein above, it is to be appreciated that various changes in form and detail may be made without departing from the spirit and scope of the present disclosure as presently or hereafter claimed.

Further Information About Technical Background to This Application

The disclosures of the following patent applications including specification, drawings, and claims are incorporated herein by reference in their entirety: Japanese Patent Application No. 2023-015400 filed on Feb. 3, 2023, and Japanese Patent Application No. 2023-141345 filed on Aug. 31, 2023.

INDUSTRIAL APPLICABILITY

The present disclosure is useful for an input device mounted on a vehicle and the like.

The invention claimed is:

1. An input device comprising:
a panel on which a pressing operation is performed by an operating body;
a substrate provided on a back surface side of the panel;
a first electrode provided on the substrate;
a holder provided on a back surface side of the substrate, the holder including a second electrode at a part facing the first electrode, the holder engaging with the panel;
an electrostatic capacity detector that detects electrostatic capacity between the first electrode and the second electrode; and
an actuator held by the holder, wherein
the holder moves relative to the substrate when the pressing operation is performed on the panel, has rigidity and conductivity, and covers the second electrode from a back surface side thereof,
the panel includes a first portion on which the pressing operation is performed and a second portion around the first portion, and is engaged with the holder at a plurality of locations in the first portion in a plan view of the panel,
the second portion is more flexible than the first portion, and
a first location of the plurality of locations is provided at a center portion of the first portion in the plan view, and a second location of the plurality of locations is provided along a boundary between the first portion and the second portion.

2. The input device according to claim 1, wherein
at least one of the panel or the holder includes a plurality of engagement portions protruding for engagement at the plurality of locations, and
the substrate includes a plurality of penetrating holes through which the plurality of engagement portions are to be inserted.

3. The input device according to claim 1, wherein
the holder includes metal.

4. The input device according to claim 1, wherein
the holder includes a plate portion having rigidity and insulation, and a metal layer on a front surface of the plate portion.

5. The input device according to claim 1, wherein
the holder is connected to ground.

6. The input device according to claim 1, wherein
the first electrode is provided on a back surface of the substrate.

7. The input device according to claim 6, wherein
the electrostatic capacity detector is provided at a position on a front surface of the substrate, the position being opposite to the first electrode with the substrate interposed therebetween, and
the electrostatic capacity detector and the first electrode are connected through a through hole provided in the substrate between the electrostatic capacity detector and the first electrode.

8. The input device according to claim 6, wherein
the electrostatic capacity detector is provided at a position on a front surface of the substrate, the front surface being opposite to the first electrode with the substrate interposed therebetween, and
the electrostatic capacity detector and the first electrode are connected through a through hole provided in the substrate.

9. The input device according to claim 1, further comprising:
a controller that controls vibration of the actuator based on an output of the electrostatic capacity detector, wherein
the controller disables the output of the electrostatic capacity detector during a period while the actuator is driven.

10. The input device according to claim 9, wherein
the controller disables the output of the electrostatic capacity detector for a predetermined period after the period while the actuator is driven.

11. The input device according to claim 10, wherein
the controller varies the predetermined period depending on a driving mode of the actuator.

12. The input device according to claim 11, wherein
the driving mode includes at least one of vibration intensity, a vibration waveform, or a vibration period of the actuator.

13. The input device according to claim 10, wherein
the predetermined period is a fixed period set in advance.

14. The input device according to claim 9, further comprising:
a sensor film that detects an operation position of the pressing operation, wherein
the controller further disables an output of the sensor film during a period while the actuator is driven.

15. The input device according to claim 1, wherein
the holder and the actuator are mechanically connected in a direction perpendicular to a surface of the panel, and
the actuator vibrates in the direction perpendicular to the surface.

16. The input device according to claim 1, wherein
the holder includes a plate portion and a protruding portion protruding from an end portion of the plate portion toward the substrate.

17. The input device according to claim 1, wherein
when the pressing operation is performed on the panel, the holder moves in a direction away from the substrate without being substantially deformed.

18. An input device comprising:
a panel on which a pressing operation is performed by an operating body;
a substrate provided on a back surface side of the panel;
a first electrode provided on the substrate;
a holder provided on a back surface side of the substrate, the holder including a second electrode at a part facing the first electrode, the holder engaging with the panel; and
an electrostatic capacity detector that detects electrostatic capacity between the first electrode and the second electrode, wherein
the holder moves relative to the substrate when the pressing operation is performed on the panel, has rigidity and conductivity, and covers the second electrode from a back surface side thereof,
the panel includes a first portion on which the pressing operation is performed and a second portion around the first portion, and is engaged with the holder at a plurality of locations in the first portion in a plan view of the panel,
the second portion is more flexible than the first portion, and
a first location of the plurality of locations is provided at a center portion of the first portion in the plan view, and a second location of the plurality of locations is provided along a boundary between the first portion and the second portion.

19. An input device comprising:
a panel on which a pressing operation is performed by an operating body;
a substrate provided on a back surface side of the panel;
a first electrode provided on a back surface of the substrate;
a holder provided on a back surface side of the substrate, the holder including a second electrode at a part facing the first electrode, the holder engaging with the panel;
an electrostatic capacity detector that detects electrostatic capacity between the first electrode and the second electrode; and
an actuator held by the holder, wherein
the holder moves relative to the substrate when the pressing operation is performed on the panel, has rigidity and conductivity, and covers the second electrode from a back surface side thereof.

20. The input device according to claim 19, wherein
the electrostatic capacity detector is provided at a position on a front surface of the substrate, the position being opposite to the first electrode with the substrate interposed therebetween, and
the electrostatic capacity detector and the first electrode are connected through a through hole provided in the substrate between the electrostatic capacity detector and the first electrode.

* * * * *